United States Patent
Tollefsrud et al.

(10) Patent No.: US 9,352,782 B2
(45) Date of Patent: May 31, 2016

(54) ADJUSTABLE AXLE ASSEMBLY FOR AN AGRICULTURAL VEHICLE

(71) Applicant: CNH America LLC, New Holland, PA (US)

(72) Inventors: Aaron R. Tollefsrud, Willmar, MN (US); Shawn N. Mortenson, Benson, MN (US); Dane M. Kallevig, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 7 days.

(21) Appl. No.: 14/055,494

(22) Filed: Oct. 16, 2013

(65) Prior Publication Data

US 2015/0102586 A1 Apr. 16, 2015

(51) Int. Cl.
*B62D 21/14* (2006.01)
*B62D 49/06* (2006.01)
*B60B 35/10* (2006.01)

(52) U.S. Cl.
CPC .............. *B62D 21/14* (2013.01); *B60B 35/109* (2013.01); *B62D 49/0678* (2013.01)

(58) Field of Classification Search
CPC .. B62D 49/0678; B62D 21/14; B60B 35/109; B60B 35/1072; B60B 35/1081; B60G 2300/40; Y10S 180/906

USPC ..................... 180/906; 301/128; 280/124.127
See application file for complete search history.

(56) References Cited

U.S. PATENT DOCUMENTS

| | | | | |
|---|---|---|---|---|
| 209,914 | A * | 11/1878 | Brown | 454/106 |
| 3,820,615 | A * | 6/1974 | Bobard | 180/340 |
| 4,040,643 | A * | 8/1977 | Applequist et al. | 280/656 |
| 5,039,129 | A * | 8/1991 | Balmer | 180/308 |
| 5,489,113 | A * | 2/1996 | Torborg | 280/638 |
| 5,598,896 | A * | 2/1997 | Haest | 180/9.48 |
| 6,145,610 | A * | 11/2000 | Gallignani | 180/9.48 |
| 6,199,769 | B1 * | 3/2001 | Weddle | 239/172 |
| 7,163,227 | B1 * | 1/2007 | Burns | 280/638 |
| 7,168,717 | B2 * | 1/2007 | Wubben et al. | 280/124.127 |
| 8,042,817 | B2 * | 10/2011 | Motebennur et al. | 280/5.514 |
| 8,376,078 | B2 * | 2/2013 | Hiddema | 180/209 |
| 2007/0201780 | A1 * | 8/2007 | Connell et al. | 384/275 |

* cited by examiner

*Primary Examiner* — John Walters
*Assistant Examiner* — Brian Swenson
(74) *Attorney, Agent, or Firm* — Rebecca L. Henkel

(57) ABSTRACT

An axle assembly for an agricultural vehicle that includes an axle configured to be coupled to a wheel. The axle comprises a body and a first arm extending from the body. The body is configured to be disposed within a frame member of the agricultural vehicle and to contact an inner surface of the frame member. Also, the axle is configured to move within the frame member to adjust a distance between the wheel and the frame member, and the first arm is configured to contact a second arm disposed within the frame member to provide structural support to the axle assembly as the axle moves within the frame member.

20 Claims, 5 Drawing Sheets

ADJUSTABLE AXLE ASSEMBLY FOR AN AGRICULTURAL VEHICLE

BACKGROUND

The invention relates generally to agricultural equipment, and more specifically, to an axle assembly of an agricultural vehicle having an adjustable width.

Various types of agricultural vehicles (e.g., sprayers, floaters, applicators, etc.) are employed to deliver fertilizer, pesticides, herbicides, seeds, or other products to the surface of a field. Such agricultural vehicles typically include a boom configured to facilitate product delivery over wide swaths of soil. In certain configurations, the boom is suspended from the vehicle, and extends laterally outward from the attachment point on the rear frame. In such configurations, agricultural vehicles drive over the soil, which may have rows of seeds that have been planted, and/or crops that are already growing. Typically it is advantageous to align wheels of the agricultural vehicle between the rows of plants. However, the distance between the rows may not be the same for every crop. Thus, a single agricultural vehicle is unable to drive between the rows of crops for crops having different spacing between rows.

BRIEF DESCRIPTION

The present invention provides an axle assembly for an agricultural vehicle that includes an axle configured to be coupled to a wheel. The axle comprises a body and a first arm extending from the body. The body is configured to be disposed within a frame member of the agricultural vehicle and to contact an inner surface of the frame member. Also, the axle is configured to move within the frame member to adjust a distance between the wheel and the frame member, and the first arm is configured to contact a second arm disposed within the frame member to provide structural support to the axle assembly as the axle moves within the frame member. As a result, when the axle moves with respect to the frame member, the wheel-track width of the agricultural vehicle also adjusts. Consequently, the agricultural vehicle may operate with one wheel-track width during one period of operation, and may operate with a different wheel-track width during a different period of operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
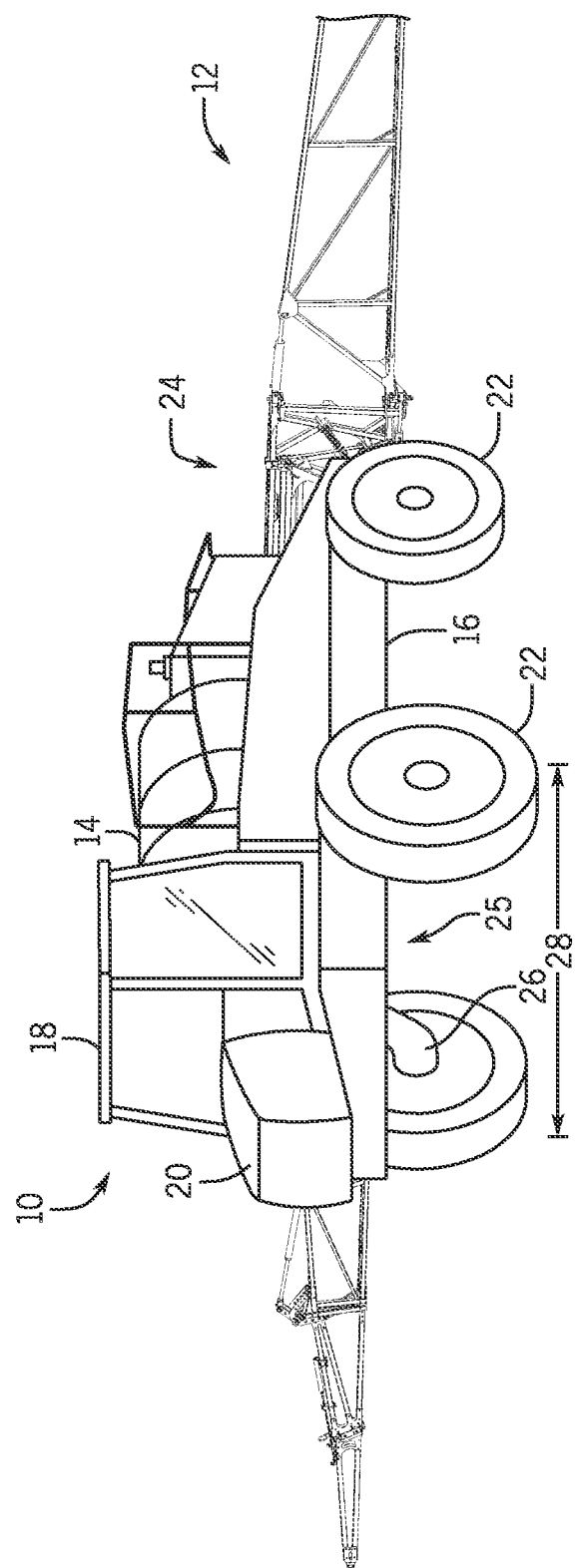
FIG. 1 is a perspective view of an embodiment of an agricultural vehicle that may include an adjustable axle assembly for changing a distance between wheels of the agricultural vehicle.

FIG. 1 is a perspective view of an embodiment of an agricultural vehicle that may include an adjustable axle assembly for changing a distance between wheels of the agricultural vehicle. The agricultural vehicle 10 includes a tank 14 where materials, such as fertilizer, pesticide, herbicide, and/or other products, are stored for distribution to a field. As illustrated, the agricultural vehicle 10 also includes a frame assembly 16, a cab 18, and a hood 20. The frame assembly 16 provides structural support for the cab 18, the hood 20, and the tank 14. Furthermore, the cab 18 provides an enclosed space for an operator, and the hood 20 houses the engine and/or systems configured to facilitate operation of the vehicle 10. The agricultural vehicle 10 also includes wheels 22 configured to support the frame assembly 16, and to facilitate movement of the vehicle across the field.

The boom assembly 12 includes a mast 24 that supports the weight of the boom, and facilitates rotation of the boom assembly 12 relative to the vehicle 10. The mast 24, in turn, is coupled to the agricultural vehicle 10 by a linkage assembly (e.g., parallel linkage, four-bar linkage, etc.) that facilitates height movement of the boom assembly 12 relative to the soil surface. When distributing product, the boom assembly 12 extends laterally outward from the agricultural vehicle 10 to cover wide swaths of soil, as illustrated. However, to facilitate transport, each lateral wing of the boom assembly 12 may be folded forwardly or rearwardly into a transport position, thereby reducing the overall width of the agricultural vehicle 10. The boom assembly 12 includes a center section having a frame configured to support left and right wing sections of the boom assembly 12. In addition, the mast 24 includes a frame coupled to the center section frame, and configured to support the center section during operation and transport. As described in detail below, the frame assembly 16 includes an adjustable axle assembly 25 having axles 26 that enable an axle track 28 of the wheels 22 to change for either the front wheels, or the rear wheels. As may be appreciated, an axle track 28 is a distance between the centerline of two wheels 22 coupled to the adjustable axle assembly 25.

Figure 2:
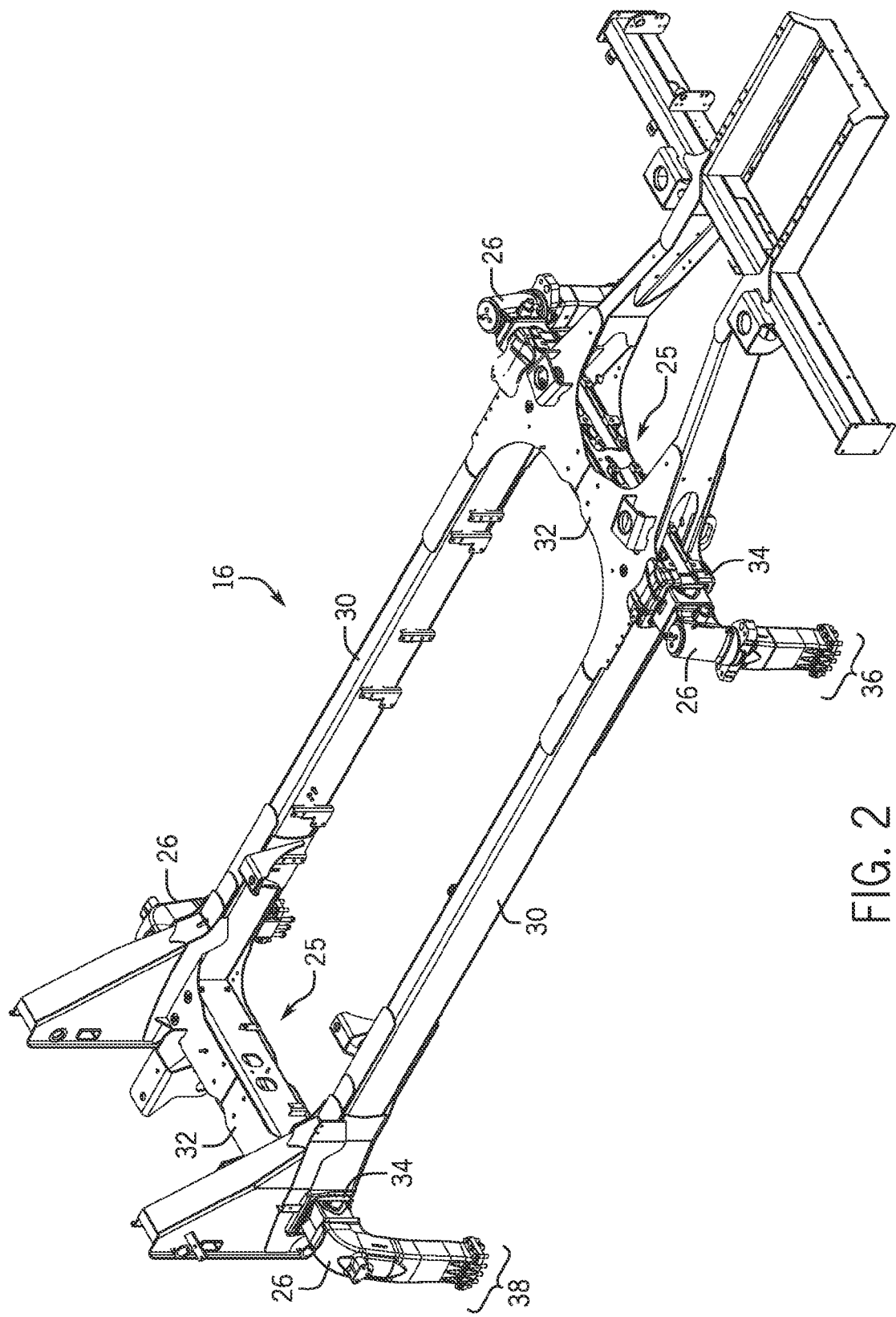
FIG. 2 is a perspective view of an embodiment of a frame assembly having an adjustable axle assembly that may be employed within the agricultural vehicle of FIG. 1.

FIG. 2 is a perspective view of an embodiment of a frame assembly having an adjustable axle assembly that may be employed within the agricultural vehicle of FIG. 1. The frame assembly 16 includes axles 26 for each wheel 22 of the agricultural vehicle 10. In the illustrated embodiment, the frame assembly 16 is configured to use four wheels 22, but other embodiments may use more or fewer wheels 22 and axles 26. The frame assembly 16 includes support beams 30 and cross beams 32 that support the vehicle 10 and couple the wheels 22 and the axles 26 to the rest of the vehicle 10 (i.e., boom assembly 12, tank 14, cab 18, etc.). The cross beams 32 include a hollow frame member 34 that extends between adjacent wheels 22 and houses the axles 26. The hollow frame member 34, as illustrated, may have a rectangular cross-section, but may also have any suitable shape. As described herein, each axle assembly 25 includes the hollow frame member 34 and two axles 26. The hollow frame member 34 is configured to allow movement of the axle 26 therein to change the axle tracks 28 of the vehicle 10.

Each axle 26 may be independently moved relative to a respective hollow frame member 34, or a front axle assembly 36 and a rear axle assembly 38 may be adjusted together. Individual movement of each axle 26 may enable customization of the axle track 28 of front and/or rear axle assemblies 36 and 38 of the vehicle 10. For example, if a front-right wheel is adjusted away from the hollow frame member 34, and a rear-left wheel is adjusted away from the hollow frame member 34, then each wheel 22 will traverse a different path as the vehicle 10 travels over a field. In other embodiments, the axles 26 of each axle assembly 25 may be adjusted concurrently (i.e., the front axle assembly 36 or the rear axle assembly 38), which may balance the vehicle 10 such that a midpoint between the wheels 22 remains centered beneath the vehicle 10.

Figure 3:
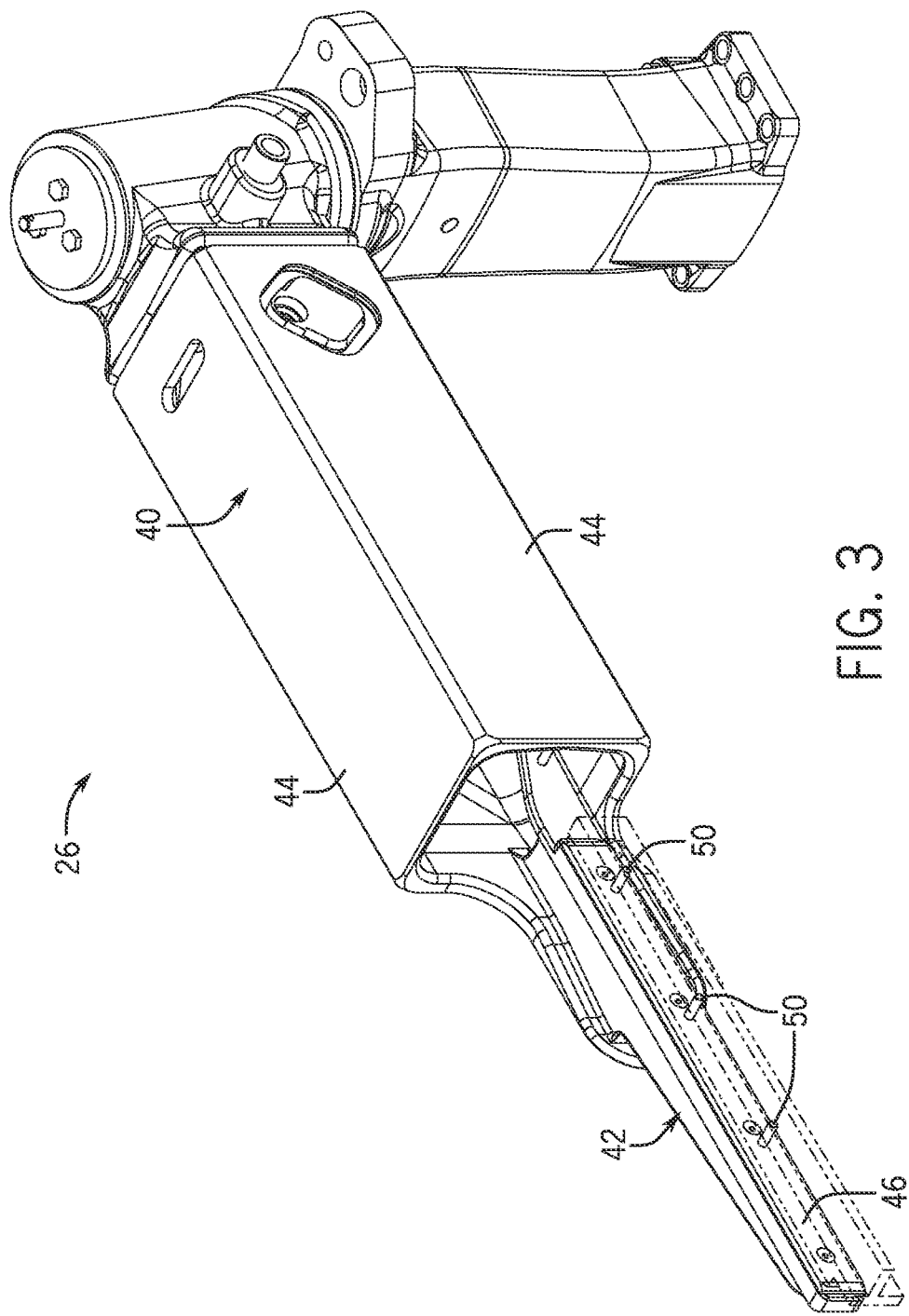
FIG. 3 is a perspective view of an embodiment of an axle of the adjustable axle assembly of FIG. 2.

FIG. 3 is a perspective view of an embodiment of an axle of the adjustable axle assembly of FIG. 2. The axle 26 includes a body 40 and an arm 42. As illustrated, the body 40 is a rectangular tube that fits within the hollow frame member 34. Exterior surfaces 44 of the body 40 contact interior surfaces of the hollow frame member 34 to stabilize the axle 26 during movement of the axle 26 and during operation of the vehicle 10. In embodiments in which the hollow frame member 34 is not rectangular, the shape of the body 40 may correspondingly be different as well. That is, four exterior surfaces 44 (e.g., sides) of the body 40 are present in the illustrated embodiment, but other embodiments may employ three, five, six, seven, eight, or more exterior surfaces 44 to correspond to three, five, six, seven, eight, or more interior surfaces of the hollow frame member 34. Round or curved surfaces may be used as well, including a cylindrical surface.

Figure 4:
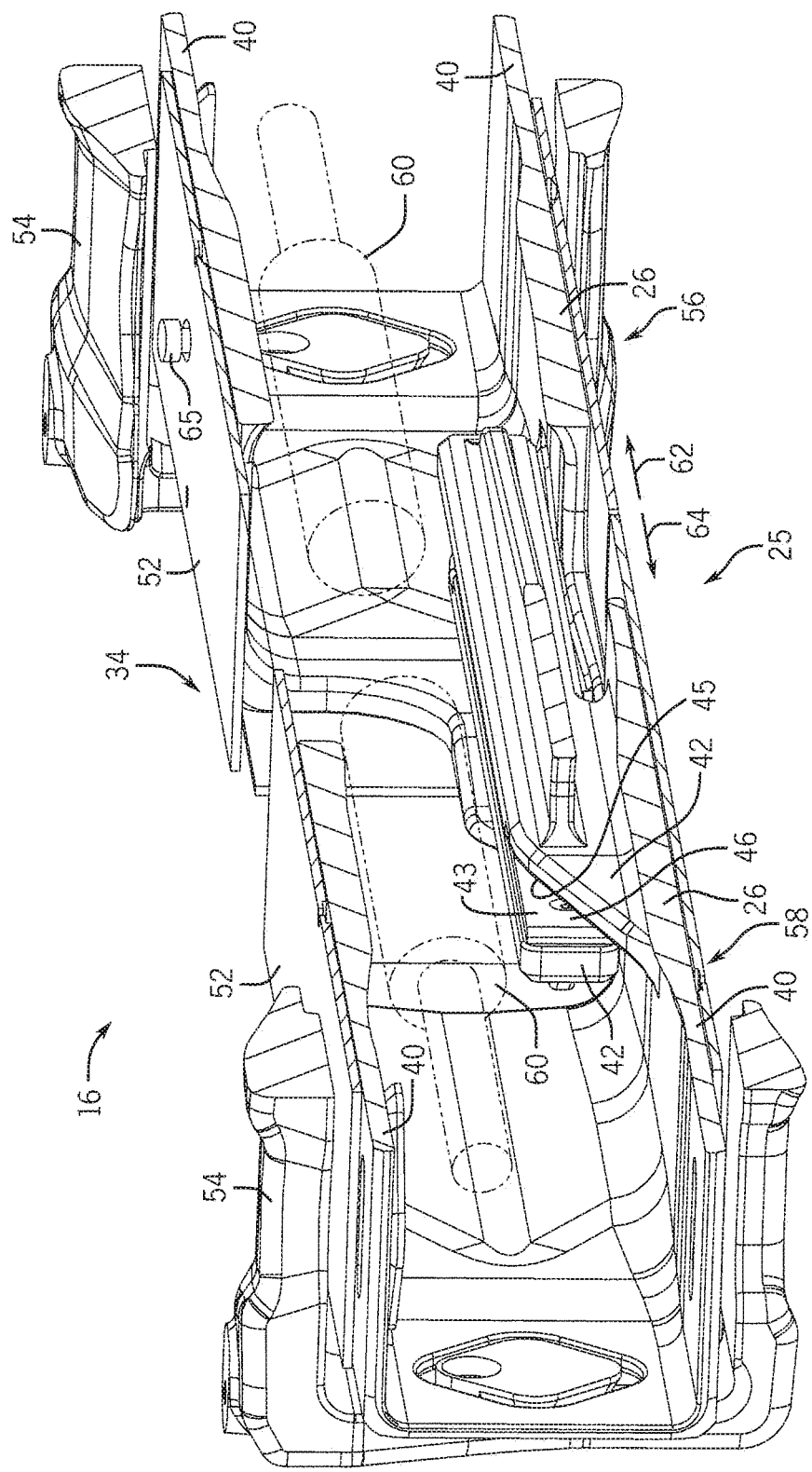
FIG. 4 is a cross-sectional view of the adjustable axle of FIG. 2.

The arm 42 is coupled to the body 40 within a hollow portion of the body 40 and extends out of the hollow portion of the body 40 of the axle 26. The arm 42 is configured to slideably contact another structure in order to further stabilize the axle 26 during and after movement of the axle. In some embodiments, the structure contacted by the arm 42 may be the frame assembly 16, or a part of the hollow frame member 34. In other embodiments, the arm 42 may contact the arm 42 of the other axle 26 of an axle assembly 25, as illustrated in FIG. 4. As shown, a first flat surface 43 of the arm 42 may contact a second flat surface 45 of the arm 42 of the other axle 26 of the axle assembly 25. To facilitate sliding of the arm 42, the arm 42 may include a friction reducing liner 46. The friction reducing liner 46 may be shaped to facilitate support for the arm 42. As illustrated, the friction reducing liner 46 has a U shape so that another arm may fit within the friction reducing liner 46. In other embodiments, other shapes may be used. The axle 26 may also include bolts 50 that secure the friction reducing liner 46 to the arm 42. The bolts 50 may be spaced at certain intervals so that the friction reducing liner 46 may be secured at different pre-determined locations.

FIG. 4 is a cross-sectional view of the adjustable axle of FIG. 2. The adjustable axle 25 includes the hollow frame member 34 and two axles 26, a first axle 56 and a second axle 58. In the illustrated embodiment, the hollow frame member 34 includes plates 52 that are held in alignment by end caps 54. Other embodiments may employ plates 52 that have been attached (e.g., welded) to each other, and further embodiments may employ a hollow frame member 34 that is formed from a single-piece hollow tube. The hollow frame member 34 supports the body 40 of the axle 26 during operation of the vehicle 10. In the illustrated embodiment, the axles 26 are shown in an innermost position. In this position, the axle track 28 is at a minimum. To increase the axle track 28, one or both axles 26 may move from the innermost position to one or more outer positions. To do this, an actuator 60 (e.g., a hydraulic cylinder, electrical cylinder, mechanical cylinder, pneumatic cylinder, etc.), or some other device, applies a force to direct the first axle 56 in a first direction 62, applies a force to direct the second axle 58 in a second direction 64, and/or applies a force to direct the first axle 56 in the first direction 62 and to direct the second axle 58 in the second direction 64.

As the axles 26 move the friction reducing liner 46 enables the arms 42 to easily slide along one another while maintaining support between the first axle 56 and the second axle 58. That is, the arm 42 of the first axle 56 provides a force against the arm 42 of the second axle 58. This force is in addition to the stabilizing forces provided to the body 40 of each of the axles 26 by the hollow frame member 34. As the axles 26 move away from the innermost position, the forces provided to the body 40 by the hollow frame member 34 decrease due to a reduction in the amount of surface area that is overlapping between the body 40 and the hollow frame member 34. The arms 42, however, maintain contact with one another throughout the full range of movement of the axles 26. The contact provided by the arms 42 counteracts the decreased force provided by the hollow frame member 34 such that the axles 26 remain stable even at the largest axle track 28 of the vehicle 10. The arms 42 may provide this stability while disposed within the hollow frame member 34 such that the arm 42 does not contact the hollow frame member 42. Moreover, the arms 42 may provide the stability with much less surface area. For example, the surface area of the body 40 of the axle 26 may be greater than two, three, four, or more times as great as the surface area of the arm 42. The adjustable axle 25 may also includes securing bolts 65 to secure the axle 26 within the hollow frame member 34. As illustrated, the bolts 65 are screwed into the plates 52 and may be removed to allow the arm 42 to slide out from the original location, after which the bolts 65 would be replaced to secure the arm 42 at the new location. The bolts 65 may secure and limit the movement of the arm 42 at locations that may be spaced at any suitable distance such as 1 cm, 2 cm, 3 cm, 4 cm, 5 cm, or more from each other. The bolt 65 may be disposed in other areas of the adjustable axles 25 as well. For example, the bolt 65 may be disposed in the hollow frame member 34, the axle 26, or some combination thereof. Furthermore, the arm 42 may employ multiple bolts 65 installed within the arm 42. It is also possible that the axle 26 is secured to the hollow frame member 34 by other attachments such that in some embodiments there are no bolts 65.

Figure 5:
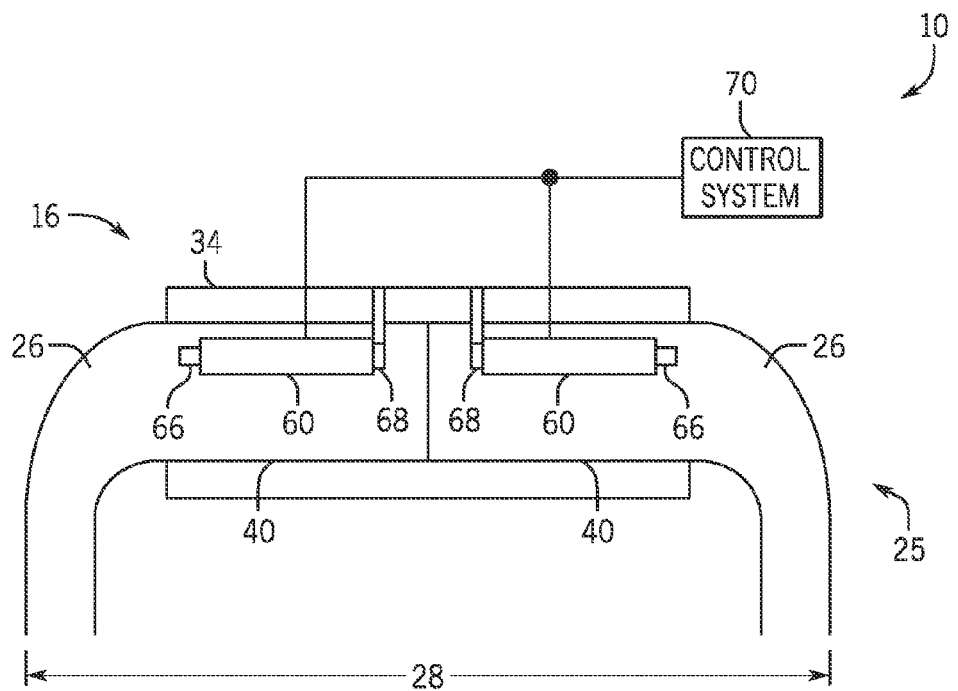
FIG. 5 is a schematic diagram of an embodiment of an axle assembly having actuators in a retracted position.

FIG. 5 is a schematic diagram of an embodiment of an axle assembly having actuators in a retracted position. The axle assembly 25 includes the hollow frame member 34 and the body 40 of each of the axles 26, as shown. The arm 42 of each of the axles 26 is housed within the body 40 of an adjacent axle 26 and the body 40 of each of the axles 26 is directly adjacent to the body 40 of an adjacent axle 26. Thus, in the illustrated embodiment, the axle track 28 is at a minimum distance. As illustrated, each axle 26 includes the actuator 60. As mentioned above, the actuator 60 may connect to both axles 26, or as illustrated in FIG. 5, the actuator 60 may connect to the frame assembly 16 and to each of the axles 26. For example, each actuator 60 may attach to the axle 26 at an axle connection point 66. The opposite end of the actuator 60 may be attached at a fixed point 68. The fixed point 68 may be part of the hollow frame member 34, part of the frame assembly 16, or may be part of some other structure within the vehicle 10. While the illustrated embodiment includes one actuator 60 per axle 26, other embodiments may include more than one actuator 60 per axle 26.

The vehicle 10 also includes a control system 70 (e.g., hydraulic control system, electrical control system, pneumatic control system, etc.) that is coupled to the actuators 60 and controls the extension or retraction of the actuators 60. While in the illustrated embodiment, the control system 70 is part of the vehicle 10, in other embodiments, the control system 70 may be external to the vehicle 10, by being part of a servicing system that controls the actuators 60 while the vehicle 10 is being serviced. In some embodiments, the control system 70 may include a hydraulic pump and/or hydraulic fluid that may be used within the actuator 60 to extend the axles 26 away from one another and/or to retract the axles 26 toward one another.

Figure 6:
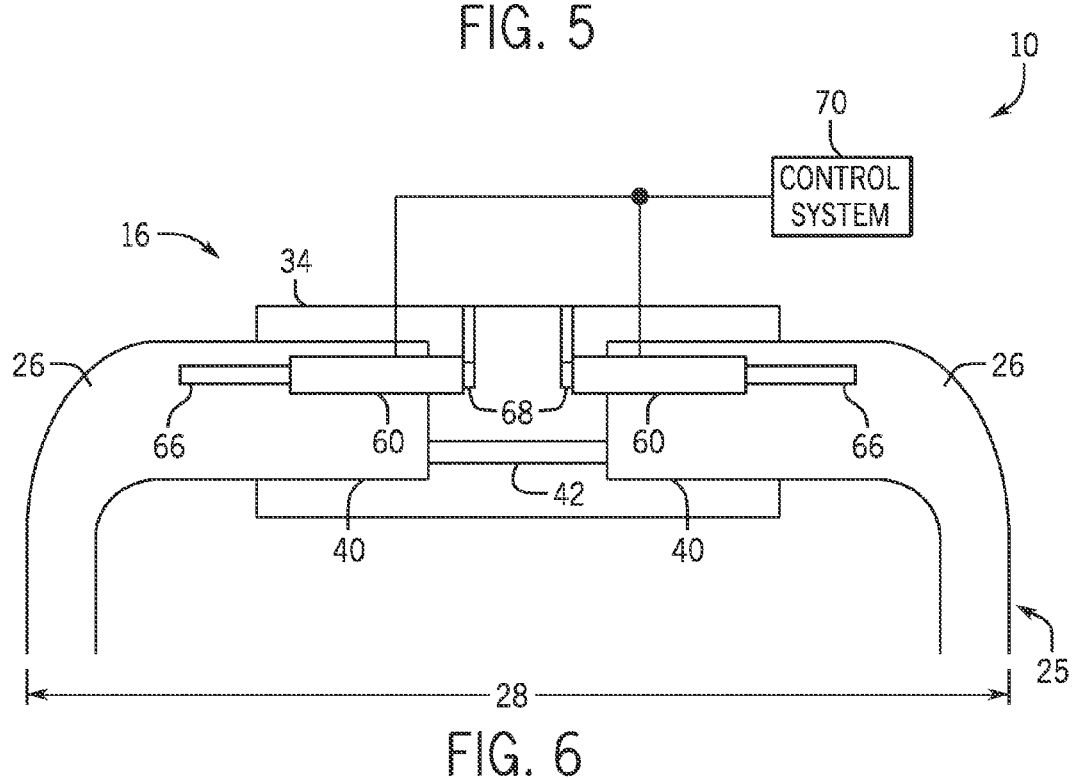
FIG. 6 is a schematic diagram of the axle assembly of FIG. 5 with the actuators in an extended position.

FIG. 6 is a schematic diagram of the axle assembly of FIG. 5 with the actuators in an extended position. The illustrated embodiment differs from the embodiment of FIG. 5 in that the actuators 60 have been extended. As illustrated, the fixed points 68 remain in an unmoved position relative to the hollow frame member 34 so that the extension of the actuators 60 causes the connection points 66 to move outwardly from the center of the hollow frame member 34. The extension of the actuators 60 directs the axle track 28 of the vehicle 10 to increase. The extension also results in separation of the axles 26, and reduces the surface area overlapping between the axles 26 and the hollow frame member 34. To increase stability and support of the axles 26 in the extended position, the overlapping arms 42 of the axles 26 maintain contact with each other and protect against shifting and vibrations that may occur during operation of the vehicle 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An axle assembly for an agricultural vehicle comprising:
a first axle configured to be coupled to a first wheel of the agricultural vehicle, wherein the first axle comprises a first body and a first arm extending from the first body, the first body is configured to be disposed within a hollow frame member of the agricultural vehicle and to contact an inner surface of the hollow frame member, and the first axle is configured to move in a first direction within the hollow frame member to adjust a distance between the first wheel and a second wheel; and
a second arm configured to be disposed within the hollow frame member, wherein the first arm comprises a first flat surface and the second arm comprises a second flat surface, each of the first flat surface and the second flat surface face a second direction perpendicular to the first direction, and the first flat surface and the second flat surface are configured to contact one another to provide structural support to the axle assembly as the first axle moves within the hollow frame member.

2. The axle assembly of claim 1, comprising the hollow frame member, wherein the hollow frame member comprises a rectangular tube.

3. The axle assembly of claim 1, wherein the first body comprises a rectangular tube.

4. The axle assembly of claim 1, wherein a friction reducing liner forms at least one of the first flat surface or the second flat surface.

5. The axle assembly of claim 1, wherein the first arm is configured to be disposed within the hollow frame member such that the first arm does not contact the hollow frame member.

6. The axle assembly of claim 1, wherein the first arm extends out of a substantially hollow portion of the first body.

7. The axle assembly of claim 1, wherein a first surface area of the first body is greater than four times a second surface area of the first arm.

8. The axle assembly of claim 1, comprising a second axle configured to be coupled to a second wheel of the agricultural vehicle, wherein the second axle comprises a second body and the second arm, and the second arm extends from the second body of the second axle.

9. The axle assembly of claim 1, wherein the second axle comprises a second body configured to be disposed within the hollow frame member and to contact the inner surface of the hollow frame member.

10. The axle assembly of claim 1, comprising the hollow frame member, wherein a bolt is disposed in the hollow frame member and the first axle and the bolt is configured to limit movement of the first axle relative to the hollow frame member.

11. The axle assembly of claim 1, comprising an actuator coupled to the first axle and configured to be coupled to the hollow frame member, wherein the actuator is configured to move the first axle relative to the hollow frame member to adjust the distance between the first wheel and the second wheel.

12. The axle assembly of claim 11, wherein the actuator is separate from the first arm.

13. An agricultural vehicle comprising:
a frame assembly having a hollow frame member configured to extend between a first wheel and a second wheel of the agricultural vehicle;
a first axle configured to be coupled to the first wheel, wherein the first axle comprises a first body and a first arm extending from the first body, the first body is configured to be disposed within the hollow frame member and to contact an inner surface of the hollow frame member, and the first axle is configured to move in a first direction within the hollow frame member to adjust a distance between the first wheel and the second wheel; and
a second axle configured to be coupled to the second wheel, wherein the second axle comprises a second body and a second arm extending from the second body, the second body is configured to be disposed within the hollow frame member and to contact an inner surface of the hollow frame member, the second axle is configured to move in the first direction within the hollow frame member to adjust the distance between the first wheel and the second wheel, the first arm comprises a first flat surface and the second arm comprises a second flat surface, each of the first flat surface and the second flat surface face a second direction perpendicular to the first direction, and the first flat surface and the second flat surface are configured to contact one another to provide structural support to the axle assembly as the first and second axles move within the hollow frame member.

14. The agricultural vehicle of claim 13, comprising a plurality of bolts disposed in one or more openings of the hollow frame member and the first axle, wherein the bolts are configured to limit movement of the first axle relative to the hollow frame member.

15. The agricultural vehicle of claim 13, comprising an actuator coupled to the first axle and configured to move the first axle relative to the hollow frame member, wherein the actuator is separate from the first arm.

16. An axle assembly for an agricultural vehicle, comprising:
a first axle configured to be coupled to a wheel, wherein the first axle comprises a body and a first arm extending from the body, wherein the body is configured to be disposed within a frame member of the agricultural vehicle and to contact an inner surface of the frame member, the first axle is configured to move within the frame member to adjust a distance between the wheel and the frame member, the first arm is configured to contact a second arm of a second axle disposed within the frame member to provide structural support to the axle assembly as the first axle moves within the frame member; and an actuator coupled to the first axle, wherein the actuator is separate from the first arm and is configured to drive the first axle relative to the frame member to adjust the distance between the wheel and the frame member.

17. The axle assembly of claim 16, wherein the body comprises a hollow portion, and the first arm is configured to attach to the body within the hollow portion and extends out of the hollow portion.

18. The axle assembly of claim 16, wherein the first arm and the second arm are configured to overlap one another while the distance is adjusted.

19. The axle assembly of claim 16, wherein at least one of the first arm or the second arm comprises a liner.

20. The axle assembly of claim 19, wherein the liner comprises a U shape.

\* \* \* \* \*